United States Patent
Cheng et al.

(10) Patent No.: US 11,070,413 B2
(45) Date of Patent: Jul. 20, 2021

(54) RESOURCE MAPPING METHOD AND APPARATUS

(71) Applicant: HUAWEI TECHNOLOGIES CO., LTD., Guangdong (CN)

(72) Inventors: Meng Cheng, Shenzhen (CN); Yiqun Wu, Shanghai (CN); Lei Wang, Shanghai (CN); Xiuqiang Xu, Shanghai (CN); Yan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 187 days.

(21) Appl. No.: 16/252,027

(22) Filed: Jan. 18, 2019

(65) Prior Publication Data

US 2019/0173711 A1 Jun. 6, 2019

Related U.S. Application Data

(63) Continuation of application No. PCT/CN2017/093536, filed on Jul. 19, 2017.

(30) Foreign Application Priority Data

Jul. 20, 2016 (CN) .......................... 201610575655.0

(51) Int. Cl.
*H04L 27/26* (2006.01)
*H04L 5/00* (2006.01)
(Continued)

(52) U.S. Cl.
CPC ............ *H04L 27/2627* (2013.01); *H04L 5/00* (2013.01); *H04L 5/0048* (2013.01);
(Continued)

(58) Field of Classification Search
CPC ..... H04L 27/2627; H04L 5/00; H04L 5/0048; H04L 5/0053; H04L 27/38; H04L 5/0005; H04W 76/27
See application file for complete search history.

(56) References Cited

U.S. PATENT DOCUMENTS

| | | | |
|---|---|---|---|
| 2011/0149944 A1* | 6/2011 | Ko ...................... | H04L 27/2614 370/344 |
| 2012/0140698 A1 | 6/2012 | Noh et al. | |

(Continued)

FOREIGN PATENT DOCUMENTS

| | | |
|---|---|---|
| CN | 101321142 A | 12/2008 |
| CN | 101388743 A | 3/2009 |

(Continued)

OTHER PUBLICATIONS

"Discussion on multiple access for new radio interface," 3GPP TSG RAN WG1 Meeting #84bis, Busan, Korea, R1-162226, pp. 1-12, 3rd Generation Partnership Project, Valbonne, France (Apr. 11-15, 2016).

(Continued)

*Primary Examiner* — Hassan Kizou
*Assistant Examiner* — Abdullahi Ahmed
(74) *Attorney, Agent, or Firm* — Leydig, Voit & Mayer, Ltd.

(57) ABSTRACT

Embodiments of the present invention provide a resource mapping method. The method includes: obtaining a modulation symbol generated based on M code words, where M is a positive integer greater than or equal to 1; mapping the modulation symbol generated based on the M code words to a time-frequency resource in one or more mapping patterns, where the mapping pattern is a pattern of mapping every Q modulation symbols to one mapping unit, the mapping unit includes F resource units, F is a positive integer greater than or equal to 1, Q is a positive integer meeting $1 \leq Q \leq F$, the (Continued)

mapping pattern includes a sparse mapping pattern, and the sparse mapping pattern is a mapping pattern meeting $F \geq 2$ and $1 \leq Q < F$; and sending the mapped modulation symbol generated based on the M code words.

15 Claims, 9 Drawing Sheets

(51) Int. Cl.
*H04L 27/38* (2006.01)
*H04W 76/27* (2018.01)

(52) U.S. Cl.
CPC ............ *H04L 5/0053* (2013.01); *H04L 27/38* (2013.01); *H04L 5/0005* (2013.01); *H04W 76/27* (2018.02)

(56) References Cited

U.S. PATENT DOCUMENTS

| | | | |
|---|---|---|---|
| 2013/0145239 A1 | 6/2013 | Pi et al. | |
| 2013/0182627 A1* | 7/2013 | Lee .................. | H04L 5/0016 370/311 |
| 2014/0328305 A1 | 11/2014 | Kim et al. | |
| 2015/0092882 A1* | 4/2015 | Lee .................. | H04L 1/0057 375/295 |
| 2015/0341912 A1 | 11/2015 | Kim et al. | |
| 2016/0028505 A1 | 1/2016 | Pi et al. | |
| 2016/0143011 A1 | 5/2016 | Xia et al. | |
| 2016/0337149 A1 | 11/2016 | Wu et al. | |
| 2017/0005754 A1 | 1/2017 | Chen et al. | |
| 2017/0005848 A1* | 1/2017 | Zheng .................. | H04L 27/2675 |
| 2017/0142593 A1* | 5/2017 | Seo .................. | H04L 1/0057 |
| 2017/0230138 A1* | 8/2017 | Xiong .............. | H04W 72/0473 |
| 2019/0044646 A1* | 2/2019 | Xu .................. | H04W 72/042 |
| 2019/0222371 A1* | 7/2019 | Sahin .................. | H04L 27/3416 |

FOREIGN PATENT DOCUMENTS

| | | |
|---|---|---|
| CN | 101753258 A | 6/2010 |
| CN | 102036380 A | 4/2011 |
| CN | 102036390 A | 4/2011 |
| CN | 103269261 A | 8/2013 |
| CN | 104054313 A | 9/2014 |
| CN | 104144030 A | 11/2014 |
| CN | 105099627 A | 11/2015 |
| EP | 2458925 A1 | 5/2012 |
| EP | 2760149 A1 | 7/2014 |
| WO | 2011003030 A1 | 1/2011 |
| WO | 2011014019 A2 | 2/2011 |
| WO | 2011140863 A1 | 11/2011 |
| WO | 2014126514 A1 | 8/2014 |
| WO | 2015113258 A1 | 8/2015 |

OTHER PUBLICATIONS

International Search Report dated Sep. 30, 2017 in corresponding International Application No. PCT/CN2017/093536.

3GPP TS 36.212 V13.2.0 (Jun. 2016), "3rd Generation Partnership Project; Technical Specification Group Radio Access Network; Evolved Universal Terrestrial Radio Access (E-UTRA); Multiplexing and channel coding" (Release 13), total 140 pages.

3GPP TS 36.211 V13.2.0 (Jun. 2016), "3rd Generation Partnership Project; Technical Specification Group Radio Access Network; Evolved Universal Terrestrial Radio Access (E-UTRA); Physical channels and modulation" (Release 13), total 168 pages.

3GPP TS 36.213 V13.2.0 (Jun. 2016), "3rd Generation Partnership Project; Technical Specification Group Radio Access Network; Evolved Universal Terrestrial Radio Access (E-UTRA); Physical layer procedures" (Release 13), total 381 pages.

3GPP TS 36.331 V13.2.0 (Jun. 2016), 3rd Generation Partnership Project; Technical Specification Group Radio Access Network; Evolved Universal Terrestrial Radio Access (E-UTRA); Radio Resource Control (RRC); Protocol specification (Release 13), total 623 pages.

International Search Report dated Sep. 30, 2017 in corresponding International Patent Application No. PCT/CN2017/093536 (7 pages).

Written Opinion of the International Searching Authority dated Sep. 30, 2017 in corresponding International Patent Application No. PCT/CN2017/093536 (4 pages).

* cited by examiner

|    | 1 | 2 | 3 | 4 | 5 | 6 | 7 | 8 | 9 | 10 | 11 | 12 |
|----|---|---|---|---|---|---|---|---|---|----|----|----|
| RE | $S_1$ | $S_2$ | $S_3$ | $S_4$ | $S_5$ | $S_6$ | $S_7$ | $S_8$ | $S_9$ | $S_{10}$ | $S_{11}$ | $S_{12}$ | ...

FIG. 3a

|    | 1 | 2 | 3 | 4 | 5 | 6 | 7 | 8 | 9 | 10 | 11 | 12 |
|----|---|---|---|---|---|---|---|---|---|----|----|----|
| RE | $S_1$ |  | $S_2$ |  | $S_3$ |  | $S_4$ |  | $S_5$ |  | $S_6$ |  | ...

FIG. 3b

|    | 1 | 2 | 3 | 4 | 5 | 6 | 7 | 8 | 9 | 10 | 11 | 12 |
|----|---|---|---|---|---|---|---|---|---|----|----|----|
| RE | $S_1$ |  |  |  | $S_2$ |  |  |  | $S_3$ |  |  |  | ...

FIG. 3c

|    | 1 | 2 | 3 | 4 | 5 | 6 | 7 | 8 | 9 | 10 | 11 | 12 |
|----|---|---|---|---|---|---|---|---|---|----|----|----|
| RE |  | $S_1$ |  |  |  | $S_2$ |  |  |  | $S_3$ |  |  | ...

FIG. 3d

|    | 1 | 2 | 3 | 4 | 5 | 6 | 7 | 8 | 9 | 10 | 11 | 12 |
|----|---|---|---|---|---|---|---|---|---|----|----|----|
| RE | $S_1$ | $S_2$ |  |  | $S_3$ | $S_4$ |  |  | $S_5$ | $S_6$ |  |  | ...

FIG. 3e

|    | 1 | 2 | 3 | 4 | 5 | 6 | 7 | 8 | 9 | 10 | 11 | 12 |
|----|---|---|---|---|---|---|---|---|---|----|----|----|
| RE | $S_1$ |  |  | $S_2$ | $S_3$ |  |  | $S_4$ | $S_5$ |  |  | $S_6$ | ...

| RE | $S_1+T_1$ | $S_2$ | $T_2$ | $T_3$ | $S_3$ | | $S_4+T_4$ | $S_5+T_5$ | | $S_6$ | $T_6$ | $T_7$ | $S_7$ | | $S_8+T_8$ | ... |
|----|-----------|-------|-------|-------|-------|---|-----------|-----------|---|-------|-------|-------|-------|---|-----------|-----|
| | 1 | 2 | 3 | 4 | 5 | 6 | 7 | 8 | 9 | 10 | 11 | 12 | 13 | 14 | 15 | 16 |

FIG. 4c

RESOURCE MAPPING METHOD AND APPARATUS

CROSS-REFERENCE TO RELATED APPLICATIONS

This application is a continuation of International Patent Application No. PCT/CN2017/093536, filed on Jul. 19, 2017, which claims priority to Chinese Patent Application No. 201610575655.0, filed on Jul. 20, 2016, The disclosures of the aforementioned applications are hereby incorporated by reference in their entireties.

TECHNICAL FIELD

This application relates to the communications field, and more specifically, to a resource mapping method and an apparatus.

BACKGROUND

Multiple access is one of core technologies of a wireless communications physical layer, and the multiple access enables a radio base station to differentiate and simultaneously serve a plurality of terminal code words, and reduce mutual interference (multi-access interference) of the terminal code words. Most existing wireless communications systems use a simple orthogonal multiple access manner, that is, a plurality of code words perform access through orthogonal division of resources in different dimensions (frequency division, time division, code division, and the like), for example, an OFDMA multiple access technology used in a current LTE system.

Because a quantity of accessed code words that can be contained by using the orthogonal multiple access technology is proportional to orthogonal resources, and a quantity of orthogonal resources is limited by an orthogonality requirement, the orthogonal multiple access technology cannot meet service requirements such as continuous coverage in a wide area, a high capacity hotspot, massive connections, and low latency access in a future 5G era. Therefore, currently non-orthogonal multiple access gradually becomes a high-profile research focus of 5G multiple access.

In the existing non-orthogonal multiple access technology, for example, in NOMA (Non-orthogonal multiple access) uplink transmission, paired code word transmission symbols are mapped to a same time-frequency resource, and mixed signals received on a base station side have a receive power difference. A resource mapping manner for a code word in the NOMA is consistent with that in an existing standard. To be specific, modulation symbols are sequentially mapped to available time-frequency resources. Therefore, in current technology research, there is no great breakthrough in resource mapping.

SUMMARY

This application provides a resource mapping method and an apparatus, provides a mapping pattern notification method and an apparatus, and provides a transport block size determining method and an apparatus.

According to a first aspect, a resource mapping method is provided, and the method includes: obtaining a modulation symbol, where the modulation symbol is generated based on M code words, and M is a positive integer greater than or equal to 1; and mapping the modulation symbol to a time-frequency resource in one or more mapping patterns; where the mapping pattern is a pattern of mapping every Q modulation symbols to one mapping unit, the mapping unit includes F resource units, F is a positive integer greater than or equal to 1, and Q is a positive integer meeting $1 \leq Q \leq F$; and the mapping pattern includes a sparse mapping pattern, and the sparse mapping pattern is a mapping pattern meeting $F \geq 2$ and $1 \leq Q < F$.

According to a second aspect, a mapping pattern notification method is provided, and the method includes: sending a pilot, where the pilot indicates one or more mapping patterns. The mapping pattern is a pattern of mapping every Q modulation symbols to one mapping unit, the mapping unit includes F resource units, F is a positive integer greater than or equal to 1, and Q is a positive integer meeting $1 \leq Q \leq F$.

In an optional implementation, the mapping pattern notification method further includes: determining a transmission resource used for sending the pilot, and the sending of the pilot is specifically to send the pilot on the determined transmission resource.

In an optional implementation, the mapping pattern notification method further includes: determining a pilot.

In an optional implementation, the pilot is determined based on a mapping relationship between a pilot and a mapping pattern.

According to a third aspect, a mapping pattern notification method is provided, and the method includes: sending or receiving signaling that indicates one or more mapping patterns, where the mapping pattern is a pattern of mapping every Q modulation symbols to one mapping unit, the mapping unit includes F resource units, F is a positive integer greater than or equal to 1, and Q is a positive integer meeting $1 \leq Q \leq F$.

In an optional implementation, the mapping pattern notification method further includes: determining the signaling of the one or more mapping patterns.

In an optional implementation, the mapping pattern is determined based on a code word, or the mapping pattern is determined based on user equipment.

According to a fourth aspect, a transport block size determining method is provided, and the method includes: determining a transport block size based on a mapping pattern. The mapping pattern is a pattern of mapping every Q modulation symbols to one mapping unit, the mapping unit includes F resource units, F is a positive integer greater than or equal to 1, and Q is a positive integer meeting $1 \leq Q \leq F$.

In an optional implementation, the transport block size determining method further includes: determining a PRB.

In an optional implementation, the transport block size is determined based on symbol sparsity of the mapping pattern, and the symbol sparsity of the mapping pattern is a ratio of Q to F; or the Q modulation symbols are from R different bits or R different bit groups, where R is a positive integer meeting $1 \leq R < Q$, and that the transport block size is determined based on a mapping pattern is specifically: the transport block size is determined based on bit sparsity of the mapping pattern, where the bit sparsity of the mapping pattern is a ratio of R to F.

According to a fifth aspect, a resource mapping method is provided, and the method includes: obtaining receiving symbols; and demodulating, from the obtained receiving symbols, a modulation symbol generated based on M code words, where M is a positive integer greater than or equal to 1. The modulation symbol generated based on the M code words is mapped to a time-frequency resource in one or more mapping patterns. The mapping pattern is a pattern of mapping Q modulation symbols to a mapping unit, the mapping unit includes F resource units, and Q and F are positive integers greater than or equal to 1. The mapping pattern includes a sparse mapping pattern, and the sparse mapping pattern is a mapping pattern meeting F≥2 and 1≤Q<F.

In an optional implementation, the demodulating, from the obtained receiving symbols, a modulation symbol generated based on M code words specifically includes: determining, based on the one or more mapping patterns, a time-frequency resource location corresponding to the modulation symbol generated based on the M code words; and demodulating, from the obtained receiving symbols based on the determined time-frequency resource location, the modulation symbol generated based on the M code words.

According to a sixth aspect, a mapping pattern notification method is provided, and the method includes: receiving a pilot, where the pilot indicates one or more mapping patterns. The mapping pattern is a pattern of mapping every Q modulation symbols to one mapping unit, the mapping unit includes F resource units, F is a positive integer greater than or equal to 1, and Q is a positive integer meeting 1≤Q≤F.

In an optional implementation, the mapping pattern notification method further includes: receiving a pilot based on a transmission resource used for sending the pilot.

In an optional implementation, the mapping pattern notification method further includes: determining a mapping pattern based on the received pilot.

In an optional implementation, the determining a mapping pattern based on the received pilot specifically includes: determining the mapping pattern based on a mapping relationship between a pilot and a mapping pattern.

According to a seventh aspect, a mapping pattern notification method is provided, and the method includes: receiving or sending signaling that indicates one or more mapping patterns, where the mapping pattern is a pattern of mapping every Q modulation symbols to one mapping unit, the mapping unit includes F resource units, F is a positive integer greater than or equal to 1, and Q is a positive integer meeting 1≤Q≤F.

In an optional implementation, the mapping pattern notification method further includes: determining the one or more mapping patterns based on the received signaling.

According to an eighth aspect, an apparatus is provided. The apparatus includes a processor and a transceiver, and may be configured to perform the method in any one of the first aspect to the seventh aspect, or the optional implementations of the first aspect to the seventh aspect.

According to a ninth aspect, a computer storage medium is provided. The computer storage medium stores program code, and the program code is used to instruct to perform the method in any one of the first aspect to the seventh aspect, or the optional implementations of the first aspect to the seventh aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

FIG. 3a to FIG. 3h and FIG. 4a to FIG. 4d are schematic diagrams of mapping patterns according to an embodiment of this application;

DESCRIPTION OF EMBODIMENTS

Figure 1A:
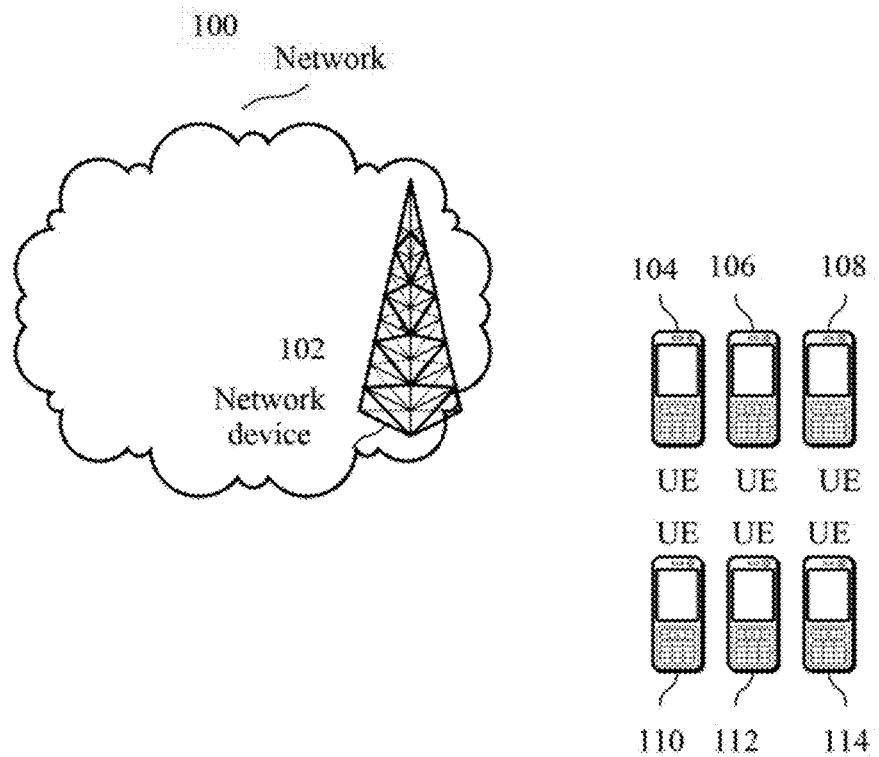
FIG. 1a is a diagram of an application scenario according to an embodiment of this application.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one component interacting with another component in a local system, a distributed system, and/or across a network such as the Internet interacting with other systems by using the signal).

It should be understood that, the technical solutions of the embodiments of the present invention may be applied to various communications systems, such as: a Global System for Mobile Communications (Global System for Mobile Communications, "GSM" for short) system, a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short), a Long Term Evolution (Long Term Evolution, "LTE" for short)

system, an LTE frequency division duplex (Frequency Division Duplex, "FDD" for short) system, an LIE time division duplex (Time Division Duplex. "TDD" for short), a Universal Mobile Telecommunications System (Universal Mobile Telecommunication System, "UMTS" for short), and a future 5G communications system.

The present invention describes the embodiments with reference to user equipment. The user equipment may also be referred to as an access terminal, a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a Session Initiation Protocol (Session Initiation Protocol, "SIP" for short) phone, a wireless local loop (Wireless Local Loop, "WLL" for short) station, a personal digital assistant (Personal Digital Assistant, PDA for short), a handheld device having a wireless communication function, a computing device, another processing device connected to a wireless modem, an in-vehicle device, a wearable device, user equipment in a future 5G network, user equipment in a future evolved PLMN network, or the like.

The present invention describes the embodiments with reference to a network device. The network device may be a device configured to communicate with user equipment. For example, the network device may be a base transceiver station (Base Transceiver Station, "BTS" for short) in a GSM system or a CDMA system, may be a NodeB (NodeB, "NB" for short) in a WCDMA system, or may be an evolved NodeB (Evolved Node B, "eNB" or "eNodeB" for short) in an LTE system. Alternatively, the network device may be a relay station, an access point, an in-vehicle device, a wearable device, a network-side device in a future 5G network, a network device in a future evolved PLMN network, or the like.

The following description is provided, but a person skilled in the art knows that grant free may be not limited to the following description.

Each embodiment of this application may be used for grant free (English: Grant Free) transmission. The grant free transmission can resolve a large quantity of MTC services in a future network, and meet low-latency and high-reliability service transmission. The grant free transmission may be specific to uplink data transmission. A person skilled in the art may know that the grant free transmission may also be referred to as another name, such as spontaneous access, spontaneous multiple access, or contention-based multiple access. Each embodiment of this application may be applied to a communications system using non-orthogonal multiple access.

FIG. 1a shows a schematic architectural diagram of a communications system to which an embodiment of the present invention is applied. As shown in FIG. 1a, the communications system 100 may include a network device 102 and user equipment 104 to user equipment 114 (referred to as UE for short), and the network device and the user equipment are connected in a wireless manner or a wired manner or another manner.

A network in this embodiment of the present invention may be a public land mobile network (Public Land Mobile Network, PLMN for short), a D2D network, an M2M network, or another network. FIG. 1a is merely a simplified schematic diagram of an example. The network may further include another network device that is not shown in FIG. 1a.

In an existing LTE standard, resource mapping of a modulation symbol is performed in a sequential mapping manner. For example, in an uplink, a signal transmitted in one timeslot may be described by using a resource grid, and a size of the resource grid is $N_{RB}^{UL} \times N_{sc}^{RE}$ subcarriers and $N_{symb}^{UL}$ SC-FDAM symbols. $N_{RB}^{UL}$ is a quantity of resource blocks (Resource Block, RB) configured by an uplink system, and $N_{sc}^{RE}$ is a quantity of subcarriers included in one RB. $N_{symb}^{UL}$ in one timeslot is determined based on a length of a cyclic prefix (Cyclic Prefix) configured by a higher layer, and $N_{symb}^{UL}=7$ in a normal CP, and $N_{symb}^{UL}=6$ in an extended CP.

A smallest unit in the resource grid is a resource element (Resource Element, RE), and is defined by a unique sequence number (k, l), where k=0, . . . , $N_{RE}^{UL}N_{sc}^{RE}-1$, and l=0, . . . , and $N_{symb}^{UL}-1$, and k and l are respectively a sequence number in frequency domain and a sequence number in time domain. RE mapping of the modulation symbol starts from timeslot 0 in subframe 0, and is performed in ascending order in each dimension, for example, first in ascending order of k, and then in ascending order of l.

The embodiments of the present invention provide a new resource mapping solution, so as to support a pattern of performing sparse mapping on a time-frequency resource. A mapping pattern may be introduced. The mapping pattern may include an LTE sequential mapping pattern, or may include a sparse mapping pattern. The sparse mapping pattern may be understood as that a modulation symbol is mapped to only some resource units in each mapping unit including F resource units. Certainly, the mapping pattern ay also include only the sparse mapping pattern.

The following describes the mapping pattern. The mapping pattern is a pattern of mapping every Q modulation symbols to one mapping unit. The mapping unit includes F resource units, F is a positive integer greater than or equal to 1, and F may be considered as a length of the mapping unit. The resource unit may be a time-frequency unit, for example, may be a smallest time-frequency unit. To better introduce the mapping method, in a table, resource units that may be used to transmit data form one one-dimensional sequence, by way of example but not limitation, in ascending order of frequency and time, and the resource units are grouped into several mapping units, where each mapping unit is a group including F resource units. F resource units in one mapping unit may be consecutive resource units in the one-dimensional sequence.

A mapping pattern in FIG. 3a may be denoted as "1". A basic mapping unit length is F=1. The pattern is equivalent to an LTE manner. Symbol sparsity of the mapping pattern is 1, and the symbol sparsity may be understood as a ratio of a quantity of modulation symbols mapped to a resource unit in one mapping unit to a total quantity of resource units in one mapping unit, or may be understood as a ratio of a quantity of resource units to which a modulation symbol is mapped in one mapping unit to a total quantity of resource units in one mapping unit.

A mapping pattern in FIG. 3b may be denoted as "10", where 1 indicates that there is modulation symbol mapping, and 0 indicates that there is no modulation symbol mapping; and vice versa. A basic mapping unit length is F=2. Symbol sparsity of the mapping pattern is ½.

A mapping pattern in FIG. 3c may be denoted as "1000". A basic mapping unit length is F=4. Symbol sparsity of the mapping pattern is ¼.

A mapping pattern in FIG. 3d may be denoted as "0010". A basic mapping unit length is F=4. Symbol sparsity of the mapping pattern is ¼.

In FIG. 3a to FIG. 3d, it may be understood that the modulation symbol is mapped to only one resource unit of the mapping unit. If the mapping unit includes a plurality of resource units, that the modulation symbol is mapped to only one resource unit of the mapping unit actually represents that the modulation symbol is mapped to only some resource units of the mapping unit.

A mapping pattern in FIG. 3e may be denoted as "1100". A basic mapping unit length is F=4. Symbol sparsity of the mapping pattern is ½.

A mapping pattern in FIG. 3f may be denoted as "1001". A basic mapping unit length is F=4. Symbol sparsity of the mapping pattern is ½.

Figures 3G, 3H, 4A, 4B:
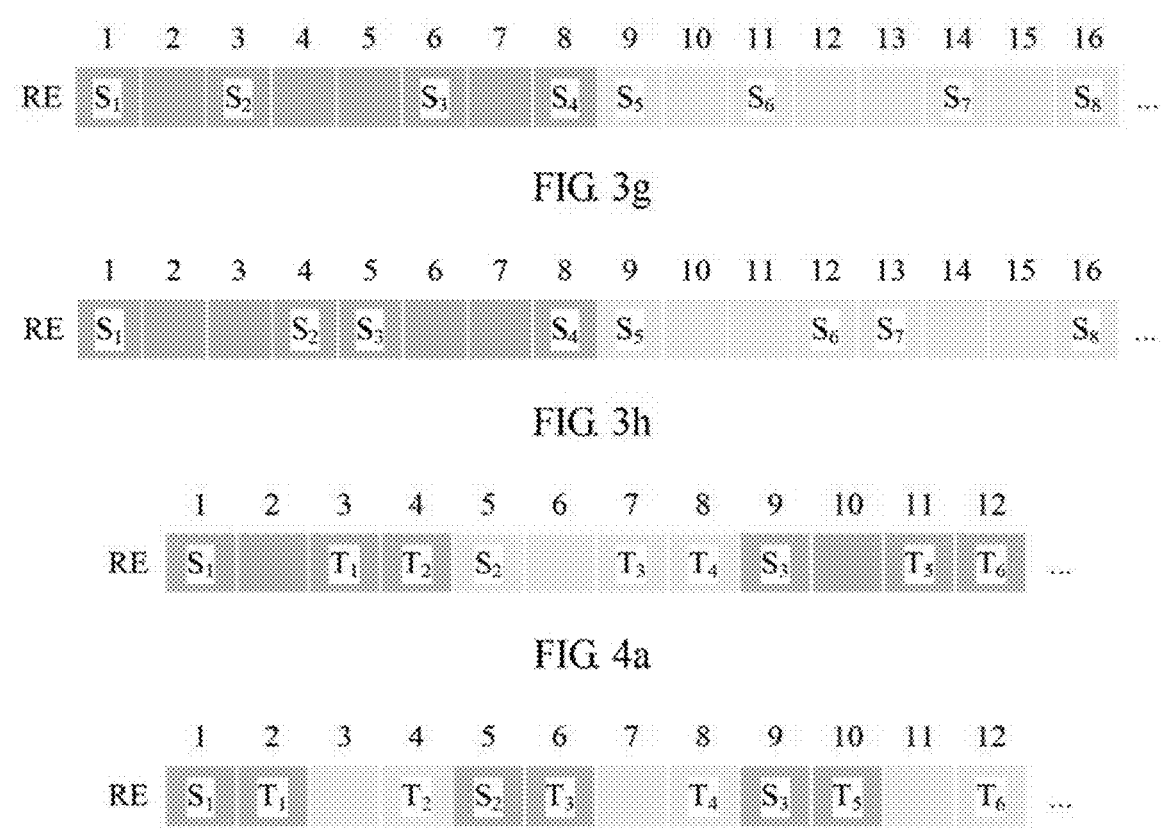

A mapping pattern in FIG. 3g may be denoted as "10100101". A basic mapping unit length is F=8. Symbol sparsity of the mapping pattern is ½.

A mapping pattern in FIG. 3h may be denoted as "10011001". A basic mapping unit length is F=8. Symbol sparsity of the mapping pattern is ½.

In FIG. 3e to FIG. 3h, it may be understood that modulation symbols are mapped to some and more resource units of the mapping unit.

A sending device or a receiving device may store mapping pattern information. The mapping pattern information may be represented in a plurality of forms, for example, may be represented in a table form, as shown in the following Table 1:

| Mapping pattern index | Mapping pattern | Mapping unit length |
|---|---|---|
| IRMP (0) | 1 | 1 |
| IRMP (1) | 10 | 2 |
| IRMP (2) | 01 | 2 |
| IRMP (3) | 1000 | 4 |
| IRMP (4) | 0100 | 4 |
| ... | ... | ... |
| IRMP (M) | 10100101 | 8 |
| IRMP (M + 1) | 10011001 | 8 |
| ... | ... | ... |

Figure 1B:
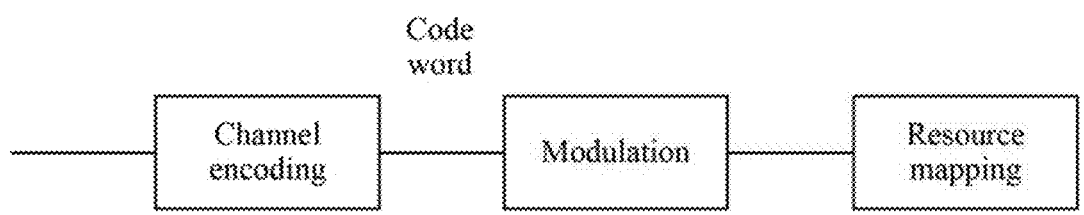
FIG. 1b is a processing procedure of a sending device according to an embodiment of this application.
Figure 1C:
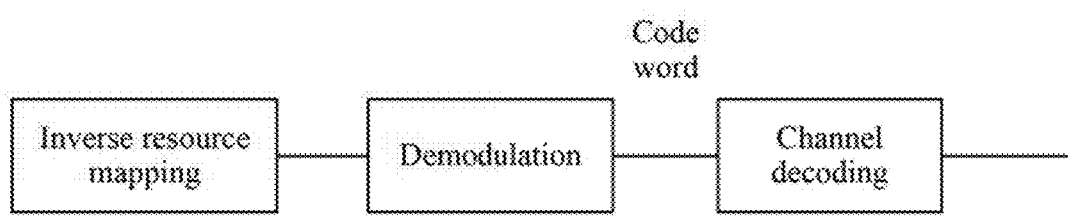
FIG. 1c is a processing procedure of a receiving device according to an embodiment of this application.

FIG. 1b describes a signal procedure of the sending device according to an embodiment of the present invention, and FIG. 1c describes a signal procedure of the receiving device according to an embodiment of the present invention. For brevity, FIG. 1b and FIG. 1c show only examples of processing procedures with one code word. For a processing procedure with a plurality of code words, refer to the processing procedures in FIG. 1b and FIG. 1c. Certainly, in an actual system, the processing procedures of the sending device and the receiving device may further include other processing. For example, the processing procedure of the sending device may further include layer mapping, preceding, and the like.

Figure 2:
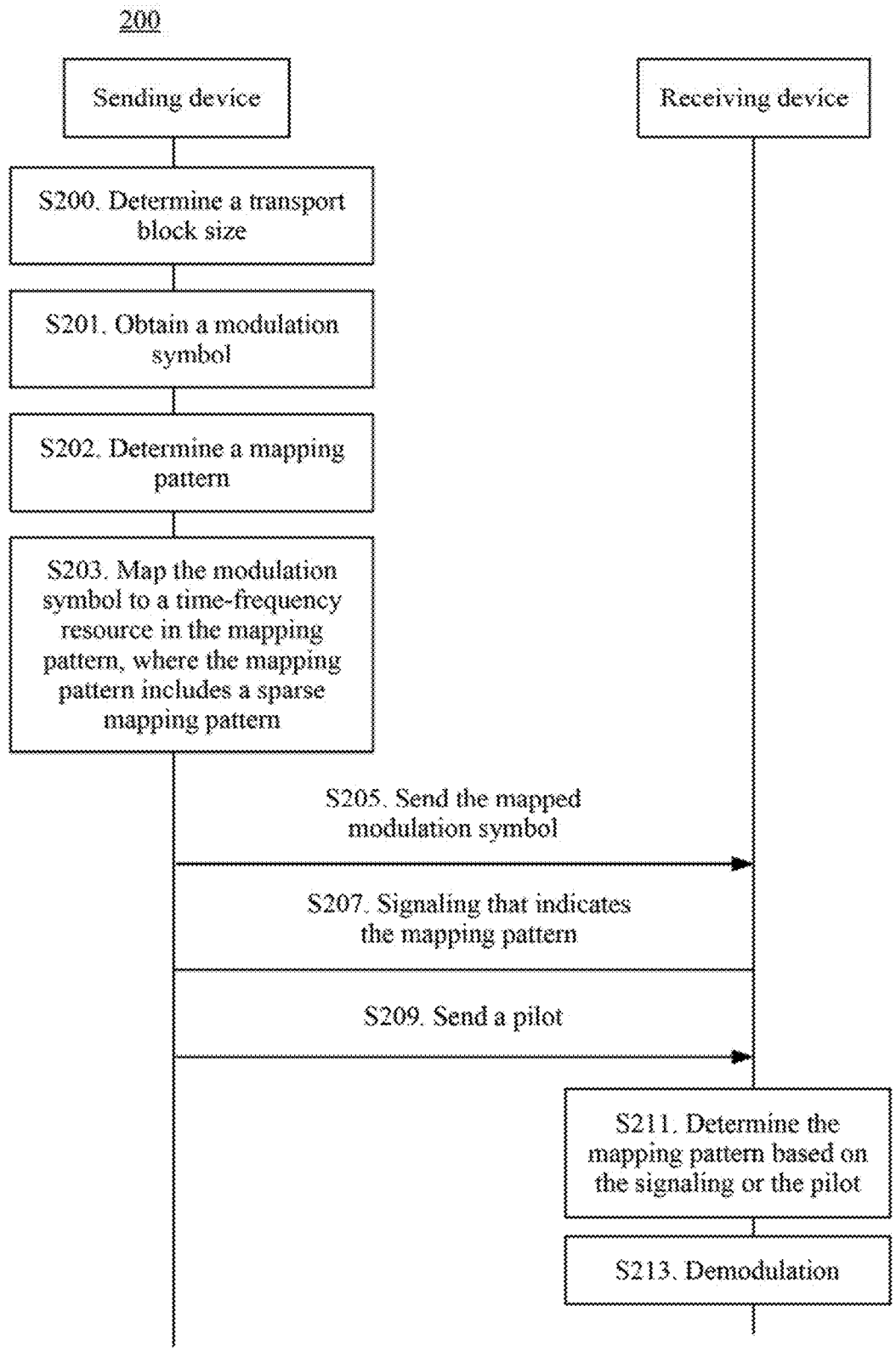
FIG. 2 is a schematic flowchart f a resource mapping method according to an embodiment of this application.

The following describes the solutions in the embodiments of the present invention in detail with reference to FIG. 2. The following processing is included.

S200: Determine a transport block size of each of M code words, where a transport block may represent a specific quantity of bits, the transport block size may be TBS for short, may be transport block size in full in English, and certainly may also be referred to as another Chinese or English name. The processing in S200 may further optionally include: determining a PRB. The PRB may be determined based on a rule preset by a system or a rule specified by a standard protocol, or may be determined by using the prior art. Details are not described.

The TBS may be determined in a plurality of manners.

1. The TBS is Determined Based on a Physical Resource Block.

The physical resource block may be PRB for short. The physical resource block may represent a specific quantity of physical resources, and may be physical resource block in full in English, and certainly the physical resource block may also be referred to as another Chinese or English name.

Optionally, the TBS is determined based on a correspondence between a PRB and a TBS, and the correspondence between a PRB and a TBS may be represented in a table manner. For example, Table 2 is searched for a TBS sequence number by using MCS and TBS indexes, and then Table 3 is searched for a TBS corresponding to the TBS sequence number based on a size of the PRB. Table 3 is merely an excerpt and an example, and actually more content may be included. Channel coding may be performed on an information bit in a unit of TBS, then modulation or preceding is performed, and then modulation symbol mapping is performed on a configured time-frequency resource in frequency and time order.

TABLE 2

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

TABLE 3

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |

2. The TBS is Determined Based on a Mapping Pattern.

(1). The TBS is Determined Based on Symbol Sparsity of the Mapping Pattern.

Certainly, the TBS may be determined based on the symbol sparsity of the mapping pattern, or optionally may be determined based on the symbol sparsity of the mapping pattern and a PRB. There may be a plurality of implementations.

(a). Manner 1 of Determining the TBS Based on the Symbol Sparsity

The TBS is determined based on the symbol sparsity of the mapping pattern, the PRB, and CRC, for example, may be determined according to the following formula 1:

$$TBS = \lfloor (TBS^* + L_{crc}) \times \beta \rfloor - L_{crc} \quad \text{Formula 1}$$

TBS* represents a TBS that is determined in the first manner of detemrining the TBS based on the physical resource block, $\lfloor \ \rfloor$ represents rounding down, $L_{CRC}$ represents a length of the CRC, and $\beta$ represents the symbol sparsity. The foregoing mentioned mapping pattern is a pattern of mapping every Q modulation symbols to one mapping unit, the mapping unit includes F resource units, and $\beta$ may be a ratio of Q to F.

Optionally, the TBS is determined based on the symbol sparsity of the mapping pattern only when a preset condition, for example, $$TBS^* \geq 24\left(\frac{1}{\beta} - 1\right)$$

is met. Further, optionally, if a preset condition is not met, the TBS may be determined in the first manner of detemrining the IBS based on the physical resource block.

Further, optionally, a TBS value or an approximation value that is determined based on the symbol sparsity of the mapping pattern and the PRB is used as a determined TBS. For example, a TBS value is determined according to the formula 1, then Table 3 is searched for a TBS value closest to the TBS value, and the closest TBS value is used as the determined TBS. The closest TBS value may be considered as an approximation value that is determined based on the symbol sparsity of the mapping pattern and the PRB.

This manner may be understood as that a TBS determined in the first manner of detemrining the TBS based on the physical resource block is then converted based on sparsity to obtain the determined TBS.

(b). Manner 2 of Determining the TBS Based on the Symbol Sparsity

An available PRB is multiplied by the symbol sparsity, for example, a valid PRB is obtained through calculation according to a formula 2, and then the TBS is determined by using the valid PRB in the first manner of detemrining the TBS based on the physical resource block. Optionally, a condition may be added, for example, M≥1/β. If the condition is not met, it indicates that a mapping pattern represented by β cannot be used, and the mapping pattern needs to be changed.

$$\tilde{M} = \lfloor M \cdot \beta \rfloor, M \geq 1/\beta \quad \text{Formula 2}$$

M is an available PRB, and $\tilde{M}$ is a valid PRB,

This manner may be considered as that the PRB is converted based on sparsity, and then the TBS is determined by using a converted PRB.

(2). The TBS is Determined Based on Bit Sparsity of the Mapping Pattern.

Certainly, the TBS may be determined based on the bit sparsity of the mapping pattern, or optionally may be determined based on the bit sparsity of the mapping pattern and a PRB. There may be a plurality of implementations.

(a). Manner 1 of Determining the TBS Based on the Bit Sparsity

The TBS is determined based on the bit sparsity of the mapping pattern, the PRB, and CRC, for example, may be determined according to the following formula 3:

$$TBS = \lfloor (TBS^* + L_{crc}) \gamma \rfloor - L_{crc} \quad \text{Formula 3}$$

TBS* represents a TBS that is determined in the first manner of detemrining the TBS based on the physical resource block, $L_{CRC}$ represents a length of the CRC, and $\gamma$ represents the bit sparsity. The foregoing mentioned mapping pattern is a pattern of mapping every Q modulation symbols to one mapping unit, the mapping unit includes F resource units, the Q modulation symbols may be from R different bits or R different bit groups, where R≤Q, and the bit sparsity $\gamma$ may be a ratio of R to F. Generally, the modulation symbol is a complex value symbol. In a case (for example, non-spread spectrum), one complex value symbol is generated after one bit (for example, a BPSK modulation scheme) or bit group (for example, a QPSK modulation scheme) is modulated, and in this case, Q is equal to R. However, in another case (for example, spread spectrum), two or more than two complex value symbols are generated after one bit or bit group is modulated, and in this case, R is less than Q. Therefore, in a specific case, compared with the symbol sparsity, the bit sparsity can better reflect a mapping sparsity status.

Optionally, the TBS is determined based on the bit sparsity of the mapping pattern only when a preset condition, for example, $$TBS^* \geq 24\left(\frac{1}{\beta} - 1\right)$$

is met. Further, optionally, if a preset condition is not met, the TBS may be determined in the first manner of determining the TBS based on the physical resource block.

Further, optionally, a TBS value or an approximation value that is determined based on the bit sparsity of the mapping pattern and the PRB is used as a determined TBS. For example, a TBS value is determined according to the formula 1, then Table 3 is searched for a TBS value closest to the TBS value, and the closest TBS value is used as the determined TBS. The closest TBS value may be considered as an approximation value that is determined based on the bit sparsity of the mapping pattern and the PRB.

This manner may be understood as that a TBS determined in the first manner of determining the TBS based on the physical resource block is then converted based on sparsity to obtain the determined TBS.

(b). Manner 2 of Determining the TBS Based on the Bit Sparsity

An available PRB is multiplied by the bit sparsity, for example, a valid PRB is obtained through calculation according to a formula 2, and then the TBS is determined by using the valid PRB in the first manner of determining the TBS based on the physical resource block. Optionally, a condition may be added, for example, M≥1/γ. If the condition is not met, it indicates that a mapping pattern represented by γ cannot be used.

$$\tilde{M} = \lfloor M \cdot \gamma \rfloor, M \geq 1/\gamma \quad \text{Formula 2}$$

M is an available PRB, and $\tilde{M}$ is a valid PRB.

This manner may be considered as that the PRB is converted based on sparsity, and then the TBS is determined by using a converted PRB.

In the embodiments of this application, a rounding up algorithm may be replaced with a rounding down algorithm, and the rounding down algorithm may also be replaced with the rounding up algorithm.

S201. Obtain a modulation symbol, where the modulation symbol is generated based on the M code words, and M is a positive integer greater than or equal to 1.

S202: Determine a mapping pattern. Optionally, the snapping pattern is determined based on a code word, for example, a mapping pattern for each of the M code words is determined. Alternatively, optionally, the mapping pattern is determined based on user equipment, for example, based on a user ID represented by the user equipment and temporary information represented by the user equipment. If one user equipment has a plurality of code words, mapping patterns for the plurality of code words are the same. This step is optional. For example, the mapping pattern has been determined based on a standard protocol or system configuration, and in this case, the mapping pattern does not need to be dynamically determined.

S203: Map the modulation symbol generated based on the M code words to a time-frequency resource in one or more mapping patterns. Optionally, the one or more mapping patterns may be M different mapping patterns, or may be less than M different mapping patterns. If there are less than M different mapping patterns, it indicates that a same mapping pattern may be used for different code words. Optionally, a modulation symbol for each of the M code words is mapped to the time-frequency resource based on a mapping pattern corresponding to the code word.

The mapping pattern is a pattern of mapping every Q modulation symbols to one mapping unit. The mapping unit includes F resource units, F is a positive integer greater than or equal to 1, and Q is a positive integer meeting 1≤Q≤F. The one or more mapping patterns include a sparse mapping pattern, the sparse mapping pattern meets F≥2 and 1≤Q<F. and sparsity of the mapping pattern is a ratio of Q to F. For a specific mapping principle, refer to the foregoing description of the mapping pattern. For example, modulation symbols for one code word may include many groups of Q modulation symbols, and in this case, every Q modulation symbols are mapped to, based on the mapping pattern, resource units included in one mapping unit.

In this application document, a symbol "≤" may represent "less than or equal to", and "≥" may represent "greater than or equal to".

If F is 1, and Q is also 1, the mapping pattern may be considered as a sequential mapping pattern, and is similar to a mapping manner in an existing LTE system. If F is a positive integer greater than or equal to 2, and the Q modulation symbols are mapped to some resource units of the mapping unit, it may be considered that 1≤Q<F, and the mapping pattern may be considered as a sparse mapping pattern.

Therefore, the mapping pattern may include the sequential mapping pattern and the sparse mapping pattern. Certainly, this embodiment of the present invention may include only the sparse mapping pattern.

The Q modulation symbols may be from R different bits or R different bit groups, and R is a positive integer meeting 1≤R<Q.

Optionally, in a communications system, for mapping of modulation symbols from a plurality of code words ("a plurality of" in this application document indicates "two" or "more than two"), one resource unit may support mapping of a modulation symbol from one code word, or may support mapping of modulation symbols from two or more than two code words.

That one resource unit may support mapping of a modulation symbol from one code word may be considered as: if M is a positive integer greater than or equal to 2, a modulation symbol from only one code word is mapped to one resource unit in the F resource units.

For example, M is 2, and the two code words are respectively denoted as a code word S and a code word Modulation symbols of the code word S is set to Si (i=1, . . . , and L1), modulation symbols of the code word T is set to Ti (i=1, . . . , and L2), and L1 and L2 represent an amount of the modulation symbols.

In an example shown in FIG. 4a, mapping unit lengths of mapping patterns for the two code words are the same, and may be described as follows by using a table.

| | Mapping pattern | Mapping unit length F |
|---|---|---|
| UE S | 1000 | 4 |
| UE T | 0011 | 4 |

In an example shown in FIG. 4b, mapping unit lengths of mapping patterns for the two code words are different, and may be described as follows by using a table.

| Mapping pattern | Mapping unit length F |
|---|---|
| UE S | 1000 | 4 |
| UE T | 01 | 2 |

That one resource unit may support mapping of modulation symbols from two or more than two code words may be considered as: if M is a positive integer greater than or equal to 2, modulation symbols from N code words are allowed to be mapped to one resource unit in the F resource units, and $2 \leq N \leq M$.

For example, M is 2, and the two code words are respectively denoted as a code word S and a code word T. Modulation symbols of the code word S is set to $S_i$ (i=1, ..., and L1), and modulation symbols of the code word T is set to $T_i$ (i=1, ..., and L2).

In an example shown in FIG. 4c, mapping unit lengths of mapping patterns for the two code words are the same, and may be described as follows by using a table.

| Resource mapping pattern | Basic mapping unit length F |
|---|---|
| UE S | 10100101 | 8 |
| UE T | 10011001 | 8 |

Figure 4D:
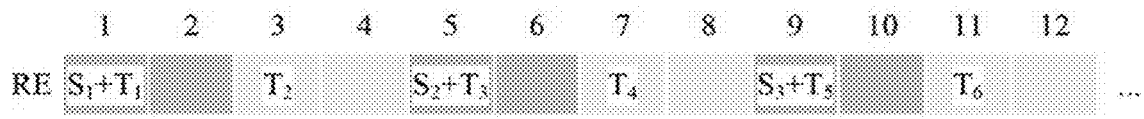

In an example shown in FIG. 4d, mapping unit lengths of mapping patterns for the two code words are different, and may be described as follows by using a table.

| Resource mapping pattern | Basic mapping unit length F |
|---|---|
| UE S | 1000 | 4 |
| UE T | 10 | 2 |

Optionally, the method includes S205: Send the modulation symbol generated based on the M code words, where the modulation symbol generated based on the M code words may be sent based on the time-frequency resource to which the modulation symbol is mapped in S203. A method in the prior art may be used in the processing. Details are not described herein. A person skilled in the art may know that the sending the modulation symbol generated based on the M code words may include a plurality of processing processes, such as up-conversion and sending on a radio frequency end.

S207: Send or receive signaling that indicates the one or more mapping patterns. In a downlink scenario, the signaling that indicates the one or more mapping patterns may be sent, for example, may be sent by a network device to user equipment, so that the user equipment learns of the mapping pattern used by the network device. Alternatively, in an uplink scenario, there may be two manners: the signaling that indicates the one or more mapping patterns may be received, for example, user equipment may receive the signaling that indicates the one or more mapping patterns and that is sent by a network device, so that the user equipment can perform, based on the received signaling, operations such as mapping pattern determining in S202 and mapping in S203; or the signaling that indicates the one or more mapping patterns is sent, for example, user equipment may determine a mapping pattern used by the user equipment, and send the signaling that indicates the one or more mapping patterns to a network device, so that the network device learns of the mapping pattern used by the user equipment. Optionally, the signaling is physical layer signaling or RRC signaling. Further, optionally, the physical layer signaling includes downlink control information, and the downlink control information indicates the one or more mapping patterns.

An example of the signaling that indicates the one or more mapping patterns may be as follows:

(1) For example, the mapping pattern is indicated by the physical layer signaling (for example, downlink control signaling). This may be used in a dynamic scheduling scenario.

For example, scheduling information indicating an uplink PUSCH is modified, for example, the following content is added to an IE (information element) of a format 0 of DCI:
Resource mapping pattern index—4 bits.

For another example, for a format 1 of scheduling information DCI indicating a downlink PDSCH, the following content may be added to an IE of the format 1 of the DCI:
Resource mapping pattern index—4 bits.

(2) For example, the mapping pattern is indicated by higher layer signaling (for example, the RRC signaling). This may be used in a scenario in which scheduling requests are not frequently made in a period of time. An IE of an RRC format may be modified.

For example, the following modification may be made to an uplink PUSCH-config message:

```
PUSCH-ConfigCommon ::=     SEQUENCE {
    pusch-ConfigBasic          SEQUENCE {
    n-SB                          INTEGER (1..4),
        ResourceMapping           INTEGER (1..16),
        hoppingMode               ENUMERATED
{interSubFrame, intraAndInterSubFrame},
        pusch-HoppingOffset       INTEGER (0..98),
        enable64QAM               BOOLEAN
    },
    ul-ReferenceSignalsPUSCH    UL-ReferenceSignalsPUSCH
}
```

The ResourceMapping INTEGER (1 ... 16) is a newly-added indication related to the mapping pattern.

For another example, a similar modification may be made to a downlink PDSCH-config message.

S209: A sending device may send a pilot, and this processing may also be executed together with S205. In an uplink transmission case, the processing may be especially applicable to a grant free transmission scenario. The sending device such as user equipment may send the pilot, and the pilot may be determined based on the mapping pattern. The following embodiment provides detailed descriptions. Therefore, the pilot indicates the one or more mapping patterns. In this scenario, generally, in the processing in S201, M may be 1, that is, a modulation symbol for one code word is obtained. Generally, in the processing in S203, the modulation symbol for the one code word may be mapped to the time-frequency resource in one mapping pattern.

Optionally, the method includes S211: Determine the mapping pattern based on the signaling or the pilot. There may be a plurality of manners. For example, if the signaling that indicates the mapping pattern is received, a receiving device may determine the mapping pattern based on the signaling. For another example, if the pilot is received, and the pilot indicates the mapping pattern, the mapping pattern may be determined based on the pilot.

S213. Demodulate, from obtained receiving symbols, the modulation symbol generated based on the M code words. Before the demodulating, from obtained receiving symbols, the modulation symbol generated based on the M code words, the method may further include processing of obtaining the receiving symbols. In an implementation process, there may be a plurality of implementations of demodulating, from the obtained receiving symbols, the modulation symbol generated based on the M code words. Examples are as follows:

1. Manner 1 of Obtaining the Modulation Symbol Based on the Mapping Pattern

Receiving symbols are obtained; and the demodulating, from obtained receiving symbols, the modulation symbol generated based on the M code words optionally includes: determining a time-frequency resource related to a to-be-demodulated receiving symbol, and obtaining the to-be-demodulated receiving symbol based on the determined time-frequency resource. The time-frequency resource related to the to-be-demodulated receiving symbol may be understood in a plurality of manners: (1). The receiving device determines, based on system configuration or a stipulation in a standard protocol, a time-frequency resource in a specific area as the time-frequency resource of the to-be-demodulated receiving symbol; and (2). The receiving device determines the time-frequency resource of the to-be-demodulated receiving symbol based on a notification message from the sending device for the time-frequency resource. The determining a time-frequency resource related to a to-be-demodulated receiving symbol, and/or obtaining the to-be-demodulated receiving symbol based on the determined time-frequency resource herein may be understood as inverse resource mapping. The inverse resource mapping in this embodiment of this application may not be a reverse process of resource mapping.

Then, the to-be-demodulated receiving symbol is demodulated based on the one or more mapping patterns. Certainly, the modulation and demodulation technology in this embodiment of this application may use a plurality of modulation and demodulation technologies. When the modulation and demodulation technology is used to perform demodulation, the demodulating the to-be-demodulated receiving symbol based on the one or more mapping patterns may be understood as: Because the to-be-demodulated receiving symbol is demodulated with reference to a mapping pattern, symbol mapping locations corresponding to the M code words can be distinguished in to-be-demodulated receiving symbols, and then demodulation is performed. Therefore, the demodulation may be specifically implemented in a plurality of manners, for example, the demodulation is implemented with reference to the mapping pattern by using a receiver algorithm.

(2) Manner 2 of Performing Demodulation Based on the Mapping Pattern

Receiving symbols are obtained; and the demodulating, from obtained receiving symbols, the modulation symbol generated based on the M code words may be understood as: A time-frequency resource location corresponding to the modulation symbol generated based on the M code words is determined based on the one or more mapping patterns. The processing may be considered as inverse resource mapping. Then, a receiving symbol at the determined time-frequency resource location is demodulated. Certainly, a person skilled in the art may know that in an implementation process of demodulating the receiving symbol at the determined time-frequency resource location, not only the receiving symbol at the determined time-frequency resource location is demodulated, but more receiving symbols than the receiving symbol at the determined time-frequency resource location may be demodulated.

Certainly, that the receiving device demodulates, based on the one or more mapping patterns, the modulation symbol generated based on the M code words may be implemented in another manner. Details are not described herein.

Certainly, the obtaining, based on the one or more mapping patterns, a demodulation symbol corresponding to the modulation symbol generated based on the M code words is briefly described in S213. Actually, S213 may be considered as being completed by one receiving device (for example, in an uplink transmission scenario), or completed by a plurality of receiving devices (for example, a downlink transmission scenario). For example, in the downlink transmission scenario, if the network device sends the modulation symbol generated based on the M code words, and the M code words are for a plurality of user equipments, for one user equipment, a modulation symbol generated based on a code word (for example, K code words, where K is a positive integer meeting $1 \leq K < M$) belonging to the user equipment may be obtained based on the one or more mapping patterns.

A processing sequence of the foregoing S200 to S213 is not limited by FIG. 2, and the sequence may change, or the steps may be simultaneously performed.

The foregoing embodiment of FIG. 2 can resolve a plurality of technical problems. For different technical problems, necessary processing is different. The following lists an example of necessary processing of the sending device. For necessary processing of the receiving device, refer to the following description or the description of the embodiments of this application. Details are not described.

Technical Problem 1: Resource Mapping Method

The method may include:

obtaining a modulation symbol, where the modulation symbol is generated based on M code words, and M is a positive integer greater than or equal to 1; and mapping the modulation symbol to a time-frequency resource in one or more mapping patterns; where the mapping pattern is a pattern of mapping every Q modulation symbols to one mapping unit, the mapping unit includes F resource units, F is a positive integer greater than or equal to 1, and Q is a positive integer meeting $1 \leq Q \leq F$; and the mapping pattern includes a sparse mapping pattern, and the sparse mapping pattern is a mapping pattern meeting $F \geq 2$ and $1 \leq Q < F$.

Because the sparse mapping pattern is introduced, and an original sequential mapping pattern in an LTE system is replaced, the system is more flexible. Through sparse mapping, a quantity of modulation symbols mapped to one resource unit can be reduced, so that data demodulation is more simplified or more efficient.

Technical Problem 2: Mapping Pattern Notification Method

There may be two types of necessary processing.

The first type includes:

sending a pilot, where the pilot indicates one or more mapping patterns, the mapping pattern is a pattern of mapping every Q modulation symbols to one mapping unit, the mapping unit includes F resource units, F is a positive integer greater than or equal to 1, and Q is a positive integer meeting $1 \leq Q \leq F$.

Because the pilot is used to indicate the one or more mapping patterns, the pilot is frequently sent, and demodulation of the pilot is relatively simple, notification of the mapping pattern can be effectively implemented in a timely manner.

The second type includes:

sending or receiving signaling that indicates one or more mapping patterns, where the mapping pattern is a pattern of mapping every Q modulation symbols to one mapping unit, the mapping unit includes F resource units, F is a positive integer greater than or equal to 1, and Q is a positive integer meeting $1 \leq Q \leq F$.

Because the signaling is used to indicate the one or more mapping patterns, notification of the mapping pattern can be effectively implemented in a timely manner.

Technical Problem 3: Transport Block Size Determining Method

The method includes:

determining a transport block size based on a mapping pattern, where the mapping pattern is a pattern of mapping every Q modulation symbols to one mapping unit, the mapping unit includes F resource units, F is a positive integer greater than or equal to 1, and Q is a positive integer meeting $1 \leq Q \leq F$.

In a case of a mapping pattern, especially in a case of a sparse mapping pattern, determining of the transport block size can be adjusted based on the mapping pattern, so that a system determines the transport block size more accurately.

For the technical problems, the sending device or the receiving device may further perform other processing in addition to the foregoing necessary processing. For the other processing, refer to the description in the embodiments of this application. Details are not described.

The following describes the solutions of this application with reference to instances of specific uplink and downlink scenarios. The uplink and downlink scenarios of this application may be based on data transmission directions. If a data transmission direction is from a network device to user equipment, the scenario is a downlink transmission scenario. If a data transmission direction is from user equipment to a network device, the scenario is an uplink transmission scenario.

1. Downlink Transmission Scenario

Figure 5:
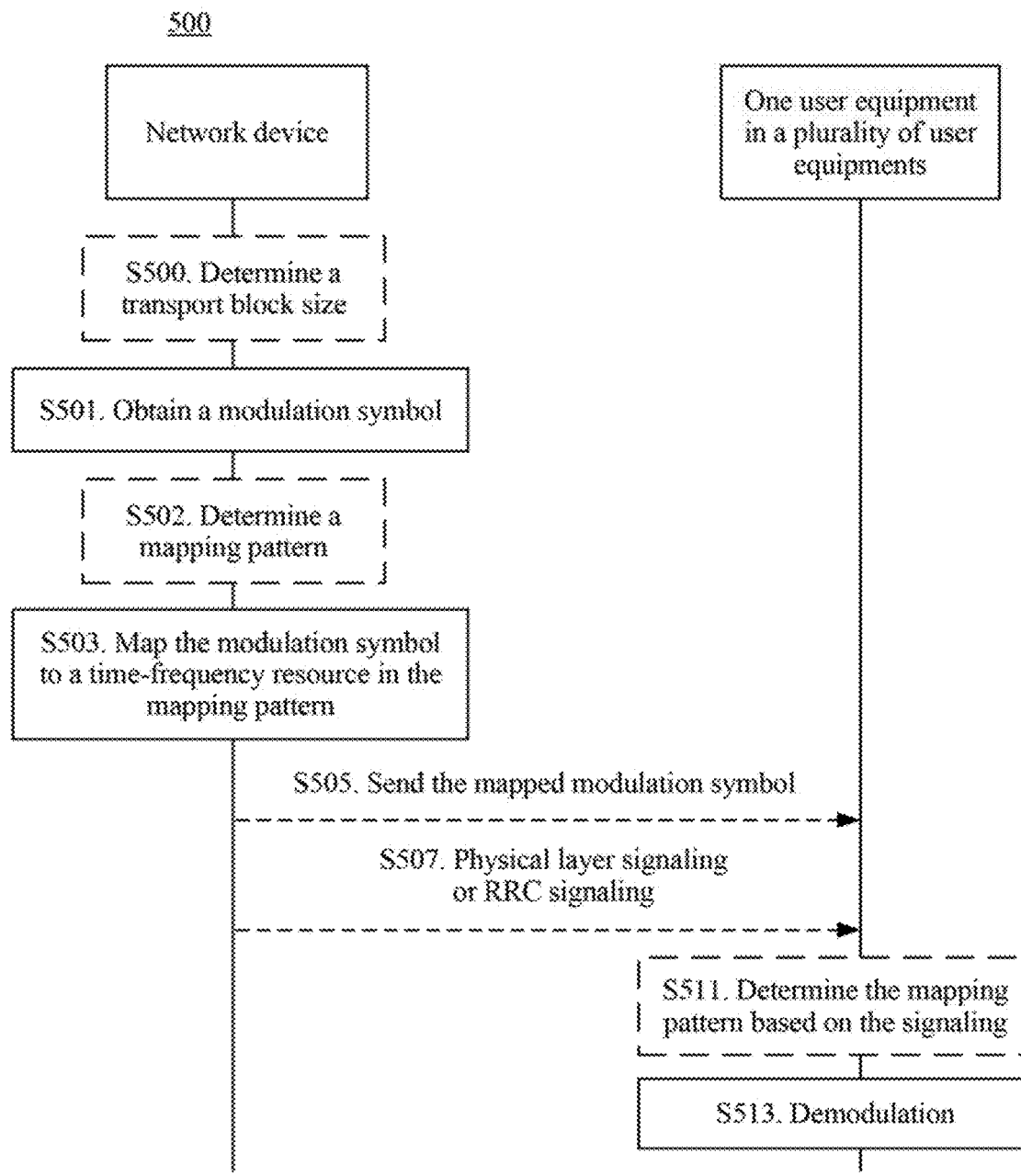
FIG. 5 is a schematic flowchart of a resource mapping method in a downlink scenario according to an embodiment of this application.

FIG. 5 is used as an example instead of limitation, and processing in S500-S507 is included. S500 to S507 may use a processing manner similar to that in S200 to S207.

There may be a plurality of receiving devices in this embodiment. For brevity, the figure shows only one user equipment.

In S511, the user equipment may learn of, by using signaling in S507, a mapping pattern used for a modulation symbol generated based on a code word sent by a network device to the user equipment.

In S513, the user equipment may obtain, by using the mapping pattern that is used for the modulation symbol generated based on the code word sent by the network device to the user equipment and that is determined in S511, a demodulation symbol of the code word sent by the network device to the user equipment.

2. Uplink Transmission Scenario

Figure 6:
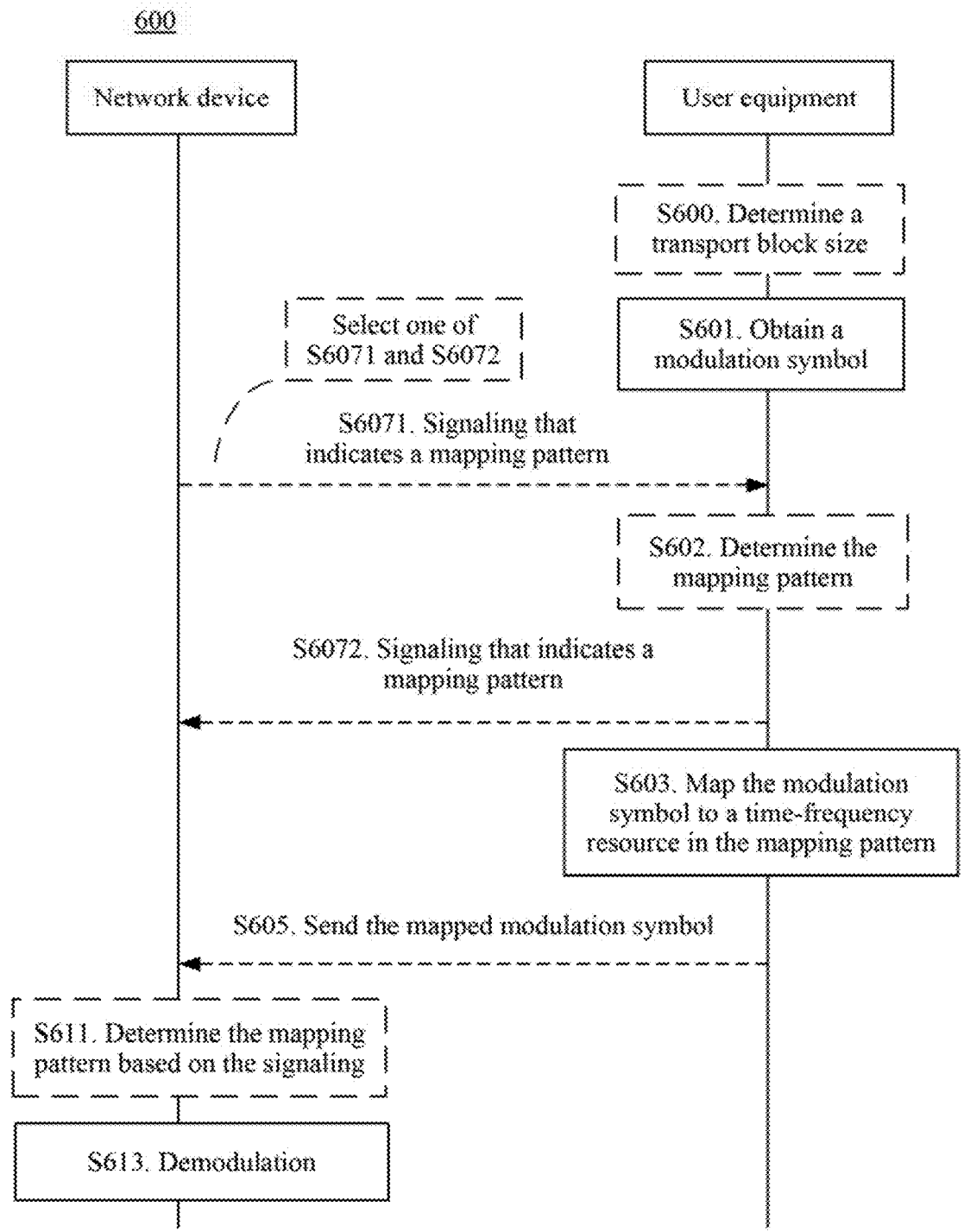
FIG. 6 and FIG. 7 are schematic flowcharts of a resource mapping method in an uplink scenario according to an embodiment of this application.
Figure 7:
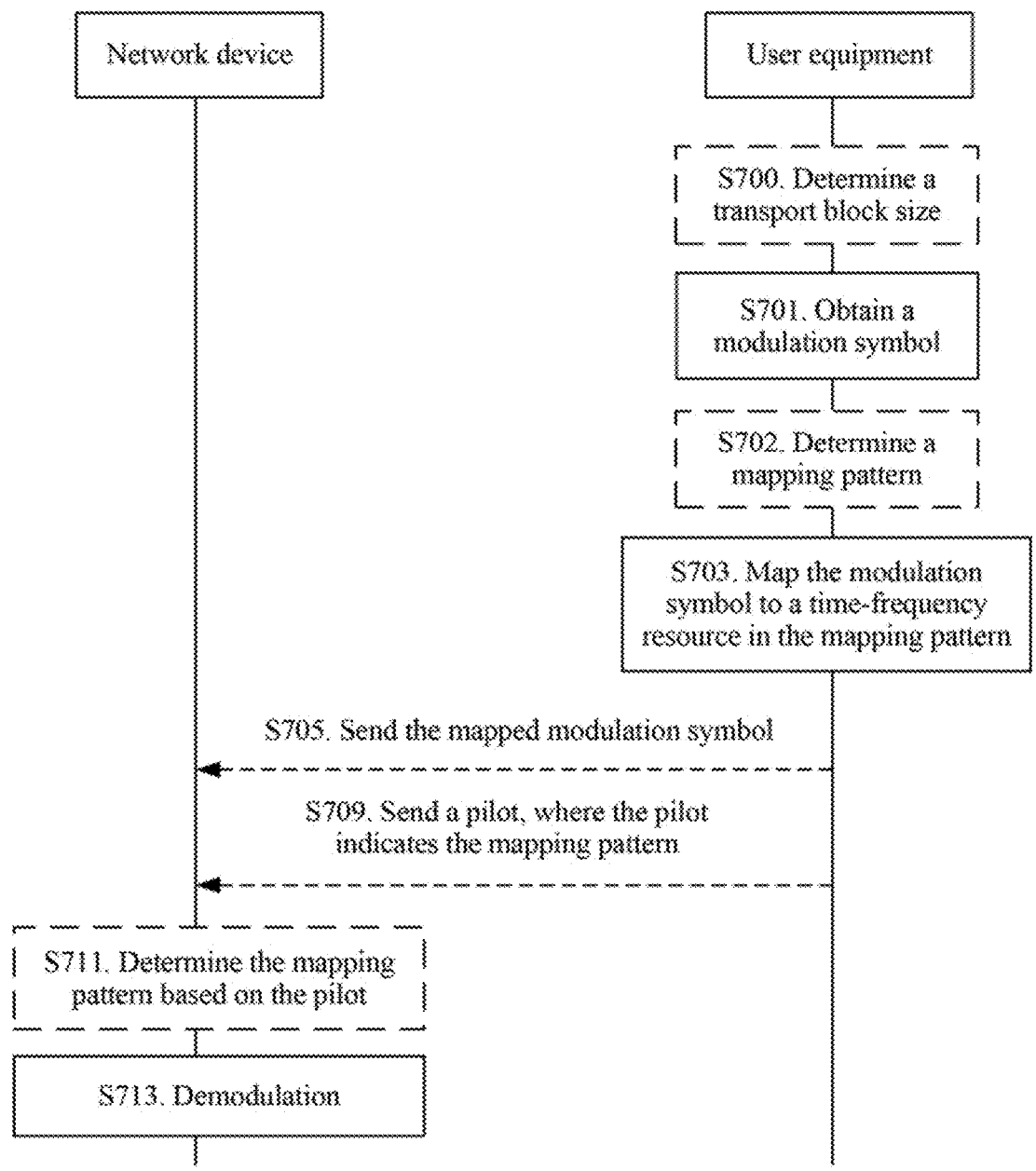

A sending device may be user equipment, and a receiving device may be a network device. Further, the devices may be used in a grant free transmission scenario. There may be a plurality of sending devices in this embodiment. For brevity, FIG. 6 or FIG. 7 shows only one user equipment. In an actual system, there may be a plurality of user equipments, and the network device may receive uplink data of the plurality of user equipments.

Due to the uplink transmission scenario, it may be considered that M code words are from one user, $M \geq 1$, and M is usually equal to 1. Both FIG. 6 and FIG. 7 are uplink transmission scenarios.

There may be two manners of notifying the mapping pattern in FIG. 6.

(1). For example, S6071 may be used. In S6071, a network device notifies user equipment of a mapping pattern used by the user equipment, for example, notifies the user equipment by sending signaling, so that the user equipment performs processing of mapping pattern determining in S602 based on S6071. For specific signaling, refer to the embodiment in FIG. 2.

(2). For example, S6072 may be used. In S6072, the user equipment may select a mapping pattern and notify the network device of the mapping pattern used by the user equipment, for example, notify the network device by sending signaling. For specific signaling, refer to the embodiment in FIG. 2.

Notification of the mapping pattern in FIG. 7 may be performed in a pilot manner.

A sending device may determine a pilot based on a mapping pattern. A receiving device receives the pilot, and may determine a used mapping pattern or mapping pattern group (which may be understood as at least two mapping patterns) based on the pilot. The mapping pattern or the mapping pattern group may be determined by using a mapping relationship between a pilot and a mapping pattern. The mapping relationship between a pilot and a mapping pattern may be a one-to-many, many-to-one, or many-to-many relationship.

An example of the one-to-many relationship may include the following Table 3 and Table 4.

In Table 3, one user equipment (in some cases, the user equipment is referred to as a user for short by a person skilled in the art) has only one code word. It means that in an uplink transmission scenario, mapping processing is performed on a modulation symbol of only one code word, and M is equal to 1.

TABLE 3

| Mapping pattern | Pilot |
| --- | --- |
| Pattern 0 | $P_{01}, P_{02}, \ldots, P_{0L}$ |
| Pattern 1 | $P_{11}, P_{12}, \ldots, P_{1L}$ |
| Pattern 2 | $P_{21}, P_{22}, \ldots, P_{2L}$ |
| ... | ... |
| Pattern w | $P_{w1}, P_{w2}, \ldots,$ and $P_{wL}$ |

In Table4, one user equipment may have a plurality of code words. It means that in the uplink transmission scenario, mapping processing is performed on modulation symbols of a plurality of code words, and $M \geq 2$. In this case, a sent pilot may indicate a plurality of mapping patterns, for example, indicate a plurality of mapping patterns used for the plurality of code words, and optionally, further indicate a plurality of different mapping patterns used for the plurality of code words. For example, in a case of two code words in the following table, any one of pilots $P_{w1}$, $P_{w2}, \ldots,$ and $P_{wL}$ in the table indicates two mapping patterns: a mapping pattern 0 and a mapping pattern 1.

TABLE 4

| Mapping pattern combination | Pilot |
|---|---|
| 1: one code word, pattern 0 | $P_{01}, P_{02}, \ldots, P_{0L}$ |
| 2: one code word, pattern 1 | $P_{11}, P_{12}, \ldots, P_{1L}$ |
| 3: one code word, pattern 2 | $P_{21}, P_{22}, \ldots, P_{2L}$ |
| ... | ... |
| W: two code words (patterns 0, 1) | $P_{w1}, P_{w2}, \ldots, P_{wL}$ |
| w + 1: two code words (patterns 0, 2) | $P_{(w+1)1}, P_{(w+1)2}, \ldots, P_{(w+1)L}$ |
| w + 2: two code words (patterns 1, 2) | $P_{(w+2)1}, P_{(w+1)2}, \ldots, P_{(w+1)L}$ |
| ... | |

Certainly, in addition to the table, the foregoing mapping relationship may also be represented in another manner, for example, by using a formula. For example, a pattern w (the pattern w is corresponding to $L_w$ pilot sequences) and a sequence number ni of the user equipment are given, and a pilot number $f_i^{RS}$ may be obtained by using the following formula:

$$f_i^{RS} = \sum_{j=0:(w-1)} L_j + \mathrm{mod}(n_i, L_w).$$

Certainly, a network device or the user equipment may further determine the mapping pattern or the mapping pattern group based on another rule, for example, a protocol stipulation, network setting, or an identifier of the user equipment.

For each processing in FIG. 6 and FIG. 7, refer to the foregoing embodiment in FIG. 2, and details are not described herein.

Examples of FIG. 5 to FIG. 7 are examples for resolving a resource mapping technology problem. A solid line box may be considered as necessary processing, and a dashed line box may be considered as optional processing. Certainly, as described in the foregoing embodiments, there may be different necessary processing steps for different technical problems, and details are not described herein.

Figure 8:
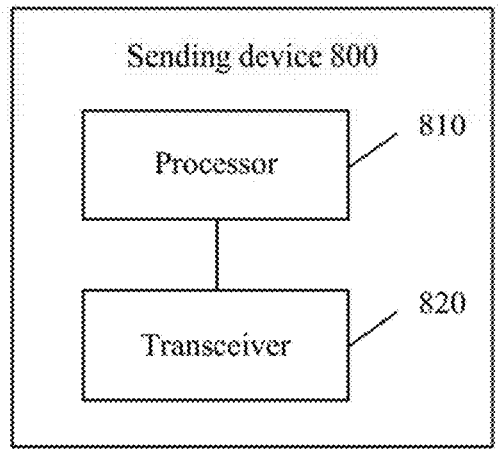
FIG. 8 is a schematic block diagram of a resource mapping apparatus according to an embodiment of this application.

FIG. 8 is a schematic block diagram of a resource mapping apparatus according to an embodiment of this application. As shown in FIG. 8, the apparatus 800 includes a processor 810 and a transceiver 820. The transceiver 820 may also be implemented by a transceiver unit or a transceiver circuit, and the processor 810 may be implemented by one or more units or circuits.

It should be understood that the apparatus 800 may be corresponding to the sending device in each method embodiment, may have any function of the sending device in the method, and may be corresponding to any function of the network device or the user equipment in the foregoing embodiments. The following uses only some functions as an example for description. However, this embodiment is not limited thereto.

The processor 810 is configured to: obtain a modulation symbol, where the modulation symbol is generated based on M code words, and M is a positive integer greater than or equal to 1; and map the modulation symbol to a time-frequency resource in one or more mapping patterns, where the mapping pattern is a pattern of mapping every Q modulation symbols to one mapping unit, the mapping unit includes F resource units, F is a positive integer greater than or equal to 1, Q is a positive integer meeting $1 \leq Q \leq F$, the mapping pattern includes a sparse mapping pattern, and the sparse mapping pattern is a mapping pattern meeting $F \geq 2$ and $1 \leq Q < F$. The obtaining of the modulation symbol may also be implemented by a modulation unit or a modulation circuit, and mapping processing may be implemented by a resource mapping unit or a resource mapping circuit.

Optionally, the transceiver 820 is configured to: send signaling that indicates the one or more mapping patterns, or receive signaling that indicates the one or more mapping patterns.

Optionally, the transceiver 820 is configured to send a pilot, and the pilot indicates the one or more mapping patterns.

Optionally, the processor 810 is further configured to:
determine a transport block size of each of the M code words, where the transport block size is determined based on a mapping pattern. The determining processing may be implemented by a transport block size determining unit or circuit.

Optionally, the processor is specifically configured to determine the transport block size based on symbol sparsity of the mapping pattern, where the symbol sparsity of the mapping pattern is a ratio of Q to F; or
the Q modulation symbols are from R different bits or R different bit groups, where R is a positive integer meeting $1 \leq R < Q$, and the processor is specifically configured to determine the transport block size based on bit sparsity of the mapping pattern, where the bit sparsity of the mapping pattern is a ratio of R to F.

Figure 9:
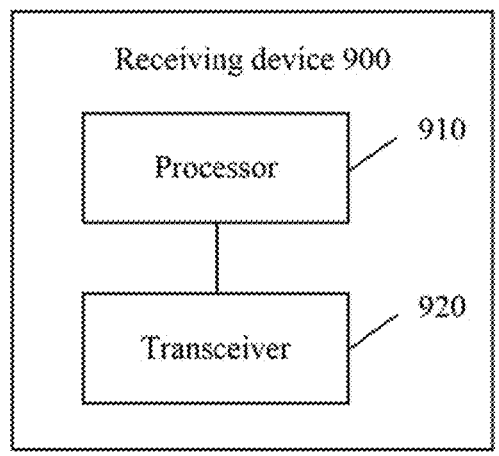
FIG. 9 is a schematic block diagram of a resource mapping apparatus according to an embodiment of this application.

FIG. 9 is a schematic block diagram of a resource mapping apparatus according to an embodiment of this application. As shown in FIG. 9, the apparatus 900 includes a processor 910 and a transceiver 920. The transceiver 920 may also be implemented by a transceiver unit or a transceiver circuit, and the processor 910 may be implemented by one or more units or circuits.

It should be understood that the apparatus 900 may be corresponding to the sending device in each method embodiment, may have any function of the receiving device in the method, and may be corresponding to any function of the network device or the user equipment in the foregoing embodiments. The following uses only some functions as an example for description. However, this embodiment is not limited thereto.

The processor 910 is configured to: obtain receiving symbols; and demodulate, from the obtained receiving symbols, a modulation symbol generated based on M code words, where M is a positive integer greater than or equal to 1.

The modulation symbol generated based on the M code words is mapped to a time-frequency resource in one or more mapping patterns, the mapping pattern is a pattern of mapping Q modulation symbols to a mapping unit, the mapping unit includes F resource units, and Q and F are positive integers greater than or equal to 1; and
the mapping pattern includes a sparse mapping pattern, and the sparse mapping pattern is a mapping pattern meeting $F \geq 2$ and $1 \leq Q < F$.

The foregoing processing may be implemented by a demodulation unit or a demodulation circuit. Alternatively, the foregoing processing may be jointly implemented by an inverse resource mapping unit or an inverse resource mapping circuit, and a demodulation unit or a demodulation circuit.

Optionally, the processor 910 is specifically configured to:
determine a time-frequency resource related to a to-be-demodulated receiving symbol, and obtain the to-be-demodulated receiving symbol based on the determined time-frequency resource, where the processing may be implemented by the inverse resource mapping unit or circuit; and demodulate the to-be-demodulated receiving symbol based on the one or more mapping patterns, where the processing may be implemented by the demodulation unit or the demodulation circuit.

Optionally, the processor 910 is specifically configured to:

determine, based on the one or more mapping patterns, a time-frequency resource location corresponding to the modulation symbol generated based on the M code words, where the processing may be implemented by the inverse resource mapping unit or circuit; and demodulate, from the obtained receiving symbols based on the determined time-frequency resource location, the modulation symbol generated based on the M code words, where the processing may be implemented by the demodulation unit or the demodulation circuit.

Optionally, the transceiver 920 is further configured to:

send signaling that indicates the one or more mapping patterns, or receive signaling that indicates the one or more mapping patterns.

Optionally, the transceiver 920 is configured to:

receive a pilot, where the pilot indicates the one or more mapping patterns.

Optionally, the apparatus 800 and the apparatus 900 may further include a memory. The memory may store program code, and the processor invokes the program code stored in the memory, to implement corresponding functions of the apparatus 800 and the apparatus 900.

Certainly, the apparatus 800 and the apparatus 900 may resolve not only a resource mapping problem, but also a technical problem of mapping pattern notification and a technical problem of transport block size determining. For different technical problems, necessary processing steps required by the processor and the transceiver are different. Refer to description in the foregoing embodiment. Details are not described herein.

The apparatus in the implementation of this application may be a field-programmable gate array (Field-Programmable Gate Array, FPGA), may be an application-specific integrated circuit (Application Specific Integrated Circuit, ASIC), may be a system on chip (System on Chip, SoC), may be a central processing unit (Central Processor Unit, CPU), may be a network processor (Network Processor, NP), may be a digital signal processing circuit (Digital Signal Processor, DSP), may be a micro controller unit (Micro Controller Unit, MCU), or may be a programmable controller (Programmable Logic Device, PLD) or another integrated chip.

An implementation of this application further includes a communications system, including the network device in the foregoing network device embodiment and the user equipment in the user equipment embodiment. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Further implementations of the present invention are provided in the following. It should be noted that the numbering used in the following section does not necessarily need to comply with the numbering used in the previous sections.

Implementation 1. A resource mapping method, comprising:

obtaining a modulation symbol, wherein the modulation symbol is generated based on M code words, and M is a positive integer greater than or equal to 1; and mapping the modulation symbol to a time-frequency resource in one or more mapping patterns; wherein the mapping pattern is a pattern of mapping every Q modulation symbols to one mapping unit, the mapping unit comprises F resource units, F is a positive integer greater than or equal to 1, and Q is a positive integer meeting $1 \leq Q \leq F$; and the mapping pattern comprises a sparse mapping pattern, and the sparse mapping pattern is a mapping pattern meeting $F \geq 2$ and $1 \leq Q < F$.

Implementation 2. The method according to Implementation 1, further comprising:

sending signaling that indicates the one or more mapping patterns, or receiving signaling that indicates the one or more mapping patterns.

Implementation 3. The method according to Implementation 1 or 2, wherein the signaling is physical layer signaling or RRC signaling.

Implementation 4. The method according to Implementation 3, wherein the physical layer signaling comprises downlink control information, and the downlink control information indicates the one or more mapping patterns.

Implementation 5. The method according to any one of implementations 1 to 4, comprising sending a pilot, wherein the pilot indicates the one or more mapping patterns.

Implementation 6. The method according to any one of implementations 1 to 5, further comprising:

determining a transport block size of each of the M code words, wherein the transport block size is determined based on a mapping pattern.

Implementation 7. The method according to any one of Implementations 1 to 6, wherein that the transport block size is determined based on a mapping pattern is specifically: the transport block size is determined based on symbol sparsity of the mapping pattern, wherein the symbol sparsity of the mapping pattern is a ratio of Q to F; or the Q modulation symbols are from R different bits or R different bit groups, wherein R is a positive integer meeting, $1 \leq R < Q$, and that the transport block size is determined based on a mapping pattern is specifically: the transport block size is determined based on bit sparsity of the mapping pattern, wherein the bit sparsity of the mapping pattern is a ratio of R to F.

Implementation 8. The method according to any one of Implementations 1 to 7, wherein the method is used in grant free transmission.

Implementation 9. A resource mapping method, comprising:

obtaining receiving symbols; and demodulating, from the obtained receiving symbols, a modulation symbol generated based on M code words, wherein M is a positive integer greater than or equal to 1; wherein the modulation symbol generated based on the M code words is mapped to a time-frequency resource in one or more mapping patterns, the mapping pattern is a pattern of mapping Q modulation symbols to a mapping unit, the mapping unit comprises F resource units, and Q and F are positive integers greater than or equal to 1; and the mapping pattern comprises a sparse mapping pattern, and the sparse mapping pattern is a mapping pattern meeting F≥2 and 1≤Q<F.

Implementation 10. The method according to Implementation 9, wherein the demodulating, from the obtained receiving symbols, a modulation symbol generated based on M code words specifically comprises:

determining a time-frequency resource related to a to-be-demodulated receiving symbol, and obtaining the to-be-demodulated receiving symbol based on the determined time-frequency resource; and demodulating the to-be-demodulated receiving symbol based on the one or more mapping patterns.

Implementation 11. The method according to Implementation 9, wherein the demodulating, from the obtained receiving symbols, a modulation symbol generated based on M code words specifically comprises:

determining, based on the one or more mapping patterns, a time-frequency resource location corresponding to the modulation symbol generated based on the M code words; and demodulating, from the obtained receiving symbols based on the determined time-frequency resource location, the modulation symbol generated based on the M code words.

Implementation 12. The method according to any one of Implementations 9 to 11, further comprising:

sending signaling that indicates the one or more mapping patterns, or receiving signaling that indicates the one or more mapping patterns.

Implementation 13. The method according to Implementation 2, wherein the signaling is physical layer signaling or RRC signaling.

Implementation 14. The method according to Implementation 13, wherein the physical layer signaling comprises downlink control information, and the downlink control information indicates the one or more mapping patterns.

Implementation 15. The method according to any one of Implementations 9 to 14, comprising receiving a pilot, wherein the pilot indicates the one or more mapping patterns.

Implementation 16. The method according to any one of Implementations 9 to 15, wherein the method is used in grant free transmission.

Implementation 17. An apparatus, comprising a processor and a transceiver, wherein the processor is configured to: obtain a modulation symbol, wherein the modulation symbol is generated based on M code words, and M is a positive integer greater than or equal to 1; and map the modulation symbol to a time-frequency resource in one or more mapping patterns; wherein the mapping pattern is a pattern of mapping every Q modulation symbols to one mapping unit, the mapping unit comprises F resource units, F is a positive integer greater than or equal to 1, and Q is a positive integer meeting 1≤Q≤F; and the mapping pattern comprises a sparse mapping pattern, and the sparse mapping pattern is a mapping pattern meeting F≥2 and 1≤Q<F.

Implementation 18. The apparatus according to Implementation 17, wherein the transceiver is configured to:

send signaling that indicates the one or more mapping patterns, or receive signaling that indicates the one or more mapping patterns.

Implementation 19. The apparatus according to implementation 17 or 18, wherein the signaling is physical layer signaling or RRC signaling.

Implementation 20. The apparatus according to Implementation 19, wherein the physical layer signaling comprises downlink control information, and the downlink control information indicates the one or more mapping patterns.

Implementation 21. The apparatus according to any one of Implementations 17 to 20, wherein the transceiver is further configured to:

send a pilot, wherein the pilot indicates the one or more mapping patterns.

Implementation 22. The apparatus according to any one of Implementations 17 to 21, wherein the processor is further configured to:

Implementation determine a transport block size of each of the M code words, wherein the transport block size is determined based on a mapping pattern.

Implementation 23. The apparatus according to Implementation 22, wherein the processor is specifically configured to determine the transport block size based on symbol sparsity of the mapping pattern, wherein the symbol sparsity of the mapping pattern is a ratio of Q to F; or the Q modulation symbols are from R different bits or R different bit groups, wherein R is a positive integer meeting 1≤R<Q, and the processor is specifically configured to determine the transport block size based on bit sparsity of the mapping pattern, wherein the bit sparsity of the mapping pattern is a ratio of R to F.

Implementation 24. The apparatus according to any one of Implementations 17 to 23, wherein the apparatus is used in grant free transmission.

Implementation 25. An apparatus, comprising a processor and a transceiver, wherein the processor is configured to:

obtain receiving symbols; and demodulate, from the obtained receiving symbols, a modulation symbol generated based on M code words, wherein M is a positive integer greater than or equal to 1; wherein the modulation symbol generated based on the M code words is mapped to a time-frequency resource in one or more mapping patterns, the mapping pattern is a pattern of mapping Q modulation symbols to a mapping unit, the mapping unit comprises F resource units, and Q and F are positive integers greater than or equal to 1; and the mapping pattern comprises a sparse mapping pattern, and the sparse mapping pattern is a mapping pattern meeting F≥2 and 1≤Q<F.

Implementation 26. The apparatus according to implementation 25, wherein in a process of demodulating, from the obtained receiving symbols, the modulation symbol generated based on the M code words, the processor is specifically configured to:

determine a time-frequency resource related to a to-be-demodulated receiving symbol, and obtain the to-be-demodulated receiving symbol based on the determined time-frequency resource; and demodulate the to-be-demodulated receiving symbol based on the one or more mapping patterns.

Implementation 27. The apparatus according to Implementation 25, wherein in a process of demodulating, from the obtained receiving symbols, the modulation symbol generated based on the M code words, the processor is specifically configured to:

determine, based on the one or more mapping patterns, a time-frequency resource location corresponding to the modulation symbol generated based on the M code words; and demodulate, from the obtained receiving symbols based on the determined time-frequency resource location, the modulation symbol generated based on the M code words.

Implementation 28. The apparatus according to any one of Implementations 25 to 27, wherein the transceiver is configured to:

send signaling that indicates the one or more mapping patterns, or receive signaling that indicates the one or more mapping patterns.

Implementation 29. The apparatus according to Implementation 28, wherein the signaling is physical layer signaling or RRC signaling.

Implementation 30. The apparatus according to Implementation 29, wherein the physical layer signaling comprises downlink control information, and the downlink control information indicates the one or more mapping patterns.

Implementation 31. The apparatus according to any one of Implementations 25 to 30, wherein the transceiver is configured to:

receive a pilot, wherein the pilot indicates the one or more mapping patterns.

Implementation 32. The apparatus according to any one of Implementations 25 to 31, wherein the apparatus is used in grant free transmission.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again. For ease of brevity, each method embodiment may also be used as mutual reference, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A resource mapping method, comprising:
obtaining a modulation symbol, wherein the modulation symbol is generated based on M code words, and M is a positive integer greater than or equal to 1;
determining a mapping pattern from one or more mapping patterns to map the modulation symbol to a time-frequency resource, based on each of the M code words or a user identification (ID) associated with a user equipment;
mapping the modulation symbol to the time-frequency resource according to the determined mapping pattern; wherein
the one or more mapping patterns include:
(a) a pattern of mapping every Q modulation symbols to one mapping unit, the mapping unit comprises F resource units, F is a positive integer greater than or equal to 1, and Q is a positive integer meeting $1 \leq Q \leq F$; and
(b) a sparse mapping pattern, and the sparse mapping pattern is a mapping pattern meeting $F \geq 2$ and $1 \leq Q < F$.

2. The method according to claim 1, further comprising:
sending signaling that indicates the one or more mapping patterns, or receiving signaling that indicates the one or more mapping patterns.

3. The method according to claim 1, comprising
sending a pilot, wherein the pilot indicates the one or more mapping patterns.

4. The method according to claim 1, further comprising:
determining a transport block size of each of the M code words, wherein the transport block size is determined based on a mapping pattern.

5. The method according to any one of claim 1, wherein that the transport block size is determined based on a mapping pattern is specifically: the transport block size is determined based on symbol sparsity of the mapping pattern, wherein the symbol sparsity of the mapping pattern is a ratio of Q to F; or
the Q modulation symbols are from R different bits or R different bit groups, wherein R is a positive integer meeting $1 \leq R < Q$, and that the transport block size is determined based on a mapping pattern is specifically:

the transport block size is determined based on bit sparsity of the mapping pattern, wherein the bit sparsity of the mapping pattern is a ratio of R to F.

6. An apparatus, comprising a processor and a transceiver, wherein
the processor is configured to: obtain a modulation symbol, wherein the modulation symbol is generated based on M code words, and M is a positive integer greater than or equal to 1;
determine a mapping pattern from one or more mapping patterns to map the modulation symbol to a time-frequency resource, based on each of the M code words or a user identification (ID) associated with a user equipment;
map the modulation symbol to the time-frequency resource according to the determined mapping pattern; wherein
the one or more mapping patterns include:
(a) a pattern of mapping every Q modulation symbols to one mapping unit, the mapping unit comprises F resource units, F is a positive integer greater than or equal to 1, and Q is a positive integer meeting $1 \leq Q \leq F$; and
(b) a sparse mapping pattern, and the sparse mapping pattern is a mapping pattern meeting $F \geq 2$ and $1 \leq Q < F$.

7. The apparatus according to claim 6, wherein the transceiver is configured to:
send signaling that indicates the one or more mapping patterns, or receive signaling that indicates the one or more mapping patterns.

8. The apparatus according to claim 6, wherein the transceiver is further configured to:
send a pilot, wherein the pilot indicates the one or more mapping patterns.

9. The apparatus according to claim 6, wherein the processor is further configured to:
determine a transport block size of each of the M code words, wherein the transport block size is determined based on a mapping pattern.

10. The apparatus according to claim 9, wherein the processor is specifically configured to determine the transport block size based on symbol sparsity of the mapping pattern, wherein the symbol sparsity of the mapping pattern is a ratio of Q to F; or
the Q modulation symbols are from R different bits or R different bit groups, wherein R is a positive integer meeting $1 \leq R < Q$, and the processor is specifically configured to determine the transport block size based on bit sparsity of the mapping pattern, wherein the bit sparsity of the mapping pattern is a ratio of R to F.

11. An apparatus, comprising a processor and a transceiver, wherein
the processor is configured to:
obtain receiving symbols; and
demodulate, from the obtained receiving symbols, a modulation symbol generated based on M code words, wherein M is a positive integer greater than or equal to 1; wherein
the modulation symbol generated based on the M code words is mapped to a time-frequency resource according to a mapping pattern, wherein the mapping pattern is determined from one or more mapping patterns based on each of the M code words or a user identification (ID) associated with a user equipment; and wherein the one or more mapping patterns include:
(a) a pattern of mapping Q modulation symbols to a mapping unit, the mapping unit comprises F resource units, and Q and F are positive integers greater than or equal to 1; and
(b) a sparse mapping pattern, and the sparse mapping pattern is a mapping pattern meeting $F \geq 2$ and $1 \leq Q < F$.

12. The apparatus according to claim 11, wherein in a process of demodulating, from the obtained receiving symbols, the modulation symbol generated based on the M code words, the processor is specifically configured to:
determine a time-frequency resource related to a to-be-demodulated receiving symbol, and obtain the to-be-demodulated receiving symbol based on the determined time-frequency resource; and
demodulate the to-be-demodulated receiving symbol based on the one or more mapping patterns.

13. The apparatus according to claim 11, wherein in a process of demodulating, from the obtained receiving symbols, the modulation symbol generated based on the M code words, the processor is specifically configured to:
determine, based on the one or more mapping patterns, a time-frequency resource location corresponding to the modulation symbol generated based on the M code words; and
demodulate, from the obtained receiving symbols based on the determined time-frequency resource location, the modulation symbol generated based on the M code words.

14. The apparatus according to claim 11, wherein the transceiver is configured to:
send signaling that indicates the one or more mapping patterns, or receive signaling that indicates the one or more mapping patterns.

15. The apparatus according to claim 11, wherein the transceiver is configured to:
receive a pilot, wherein the pilot indicates the one or more mapping patterns.

* * * * *